US010512039B2

(12) United States Patent
Boixadera-Espax et al.

(10) Patent No.: US 10,512,039 B2
(45) Date of Patent: Dec. 17, 2019

(54) DEVICE-DRIVEN POWER SCALING IN ADVANCED WIRELESS MODEM ARCHITECTURES

(71) Applicant: MediaTek Singapore Pte. Ltd., Singapore (SG)

(72) Inventors: Francesc Boixadera-Espax, Cambridge (GB); Simon George-Kelso, Cambridge (GB); Cyril Valadon, Letchworth Garden City (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 131 days.

(21) Appl. No.: 15/657,392

(22) Filed: Jul. 24, 2017

(65) Prior Publication Data
US 2018/0063785 A1    Mar. 1, 2018

Related U.S. Application Data

(60) Provisional application No. 62/379,275, filed on Aug. 25, 2016.

(51) Int. Cl.
*H04W 52/02* (2009.01)
(52) U.S. Cl.
CPC ..... *H04W 52/0216* (2013.01); *H04W 52/028* (2013.01); *H04W 52/0232* (2013.01); *H04W 52/0245* (2013.01); *H04W 52/0287* (2013.01); *Y02D 70/00* (2018.01); *Y02D 70/1262* (2018.01); *Y02D 70/1264* (2018.01); *Y02D 70/20* (2018.01); *Y02D 70/23* (2018.01);
(Continued)

(58) Field of Classification Search
None
See application file for complete search history.

(56) References Cited

U.S. PATENT DOCUMENTS 8,676,149 B2    3/2014  Beamish
9,042,289 B2    5/2015  De Chanterac
(Continued)

FOREIGN PATENT DOCUMENTS

WO    WO2000031990 A2    6/2000

*Primary Examiner* — Phirin Sam
*Assistant Examiner* — Faiyazkhan Ghafoerkhan
(74) *Attorney, Agent, or Firm* — Han IP PLLC; Andy M. Han

(57) ABSTRACT

Methods and apparatuses pertaining to device-driven power scaling in advanced wireless modem architectures are described. A processor of a communication apparatus with time-varying peak processing capability during active operations negotiates with a wireless network, to which the communication apparatus is communicatively connected, to select one of a plurality of temporary capability states ranging between zero and peak performance of the communication apparatus. The processor initiates a capability state change such that the communication apparatus enters the selected temporary capability state from a current temporary capability state of the plurality of temporary capability states. The lifetime of the selected temporary capability state exceeds a control information period used by the wireless network to dynamically schedule data transmissions with the communication apparatus. The data transmissions between the communication apparatus and the wireless network are constrained according to the selected temporary capability state.

19 Claims, 10 Drawing Sheets

(52) U.S. Cl.
CPC .............. *Y02D 70/24* (2018.01); *Y02D 70/25* (2018.01); *Y02D 70/26* (2018.01)

(56) References Cited

U.S. PATENT DOCUMENTS

| | | |
|---|---|---|
| 2006/0126611 A1 | 6/2006 | Kelly et al. |
| 2007/0242634 A1* | 10/2007 | Calcev .............. H04W 52/0225 370/318 |
| 2008/0045159 A1* | 2/2008 | Mashimo ................ H04L 12/12 455/68 |
| 2013/0107727 A1 | 5/2013 | Lunden et al. |
| 2013/0261814 A1 | 10/2013 | Shrall et al. |
| 2013/0311804 A1* | 11/2013 | Garg ..................... G06F 1/3203 713/320 |
| 2014/0036748 A1* | 2/2014 | Mukherjee ........ H04W 52/0212 370/311 |
| 2015/0198998 A1 | 7/2015 | Nanda et al. |

\* cited by examiner

1000

NEGOTIATE, BY A PROCESSOR OF A COMMUNICATION APPARATUS WITH TIME-VARYING PEAK PROCESSING CAPABILITY DURING ACTIVE OPERATIONS, WITH A WIRELESS NETWORK TO WHICH THE COMMUNICATION APPARATUS IS COMMUNICATIVELY CONNECTED TO SELECT ONE OF A PLURALITY OF TEMPORARY CAPABILITY STATES RANGING BETWEEN ZERO AND PEAK PERFORMANCE OF THE COMMUNICATION APPARATUS
1010

INITIATE, BY THE PROCESSOR, A CAPABILITY STATE CHANGE SUCH THAT THE COMMUNICATION APPARATUS ENTERS THE SELECTED TEMPORARY CAPABILITY STATE OF THE PLURALITY OF TEMPORARY CAPABILITY STATES FROM A CURRENT TEMPORARY CAPABILITY STATE OF THE PLURALITY OF TEMPORARY CAPABILITY STATES
1020

- A LIFETIME OF THE SELECTED TEMPORARY CAPABILITY STATE EXCEEDS A CONTROL INFORMATION PERIOD USED BY THE WIRELESS NETWORK TO DYNAMICALLY SCHEDULE DATA TRANSMISSIONS WITH THE COMMUNICATION APPARATUS

- THE DATA TRANSMISSIONS BETWEEN THE COMMUNICATION APPARATUS AND THE WIRELESS NETWORK ARE CONSTRAINED ACCORDING TO THE SELECTED TEMPORARY CAPABILITY STATE

FIG. 10

DEVICE-DRIVEN POWER SCALING IN ADVANCED WIRELESS MODEM ARCHITECTURES

CROSS REFERENCE TO RELATED PATENT APPLICATION(S)

The present disclosure is part of a non-provisional application claiming the priority benefit of U.S. Patent Application No. 62/379,275, filed on 25 Aug. 2016, which is incorporated by reference in its entirety.

TECHNICAL FIELD

The present disclosure is generally related to wireless communications and, more particularly, to device-driven power scaling in advanced wireless modem architectures.

BACKGROUND

Unless otherwise indicated herein, approaches described in this section are not prior art to the claims listed below and are not admitted as prior art by inclusion in this section.

Wireless modems for mobile devices are continually evolving to support ever higher data rates, improve spectral efficiency and provide lower latency. Each new enhancement tends to increase processing requirements and hence power consumption. Although the batteries that power mobile devices are also increasing in capacity over time, the rate of capacity increase for batteries is much slower, and preservation of battery life is an increasingly important consideration in modem design.

Many of the circuit techniques used to meet the high throughput requirements do not scale well in power terms when the throughput is reduced, so that in some cases a 90% reduction in data rates might only reduce device power consumption by 10%. The efficiency (energy per bit) of transferring data is therefore much reduced at lower data rates, and while lower power modes of operation (for example, dynamic voltage/frequency scaling) are possible if the lower throughput is predictable, switching between low- and high-power modes is not instantaneous. The low latency requirement means that the wireless modems (herein interchangeably referred as "modems") are required to respond very rapidly to sudden peaks in data traffic in reaction to information contained in the control channel, which limits some opportunities for power reduction.

This issue is better depicted with a simple example. For the case of $3^{rd}$ Generation Partnership Project (3GPP) Long-Term Evolution (LTE), a User Equipment (UE) modem needs to receive and decode the Physical Downlink Control Channel (PDCCH) on every Transmission Time Interval (TTI, equal to 1 ms). The PDCCH enables the modem to determine how much data the network has sent to it within an individual TTI. Under the existing LTE standard, on every single successive TTI this modem needs to have all its internal circuitry ready to process a variable amount of data up to the highest possible downlink data rate according that its capability class can support. For an LTE Category 4 device the maximum instantaneous data rate is 150 Mbits per second. There are many scenarios in which the maximum data rate can be safely predicted never to exceed a level which can be several orders of magnitude lower than the maximum instantaneous data rate that the UE can support. Unfortunately, the 3GPP standard is at present constraining the modem to always be ready to process at the maximum rate, which prevents a modem from setting the modem circuitry at a far more power-efficient lower peak processing state, even when the data rates are known to be much lower.

An additional consideration is that the circuitry response time to re-configure modem for a lower processing capability is typically longer than the TTI duration used by a base station to schedule a varying amount of data to a specific UE within a given TTI. Given that the speed of data rate change is driven by the TTI duration, it is generally not possible to track the variations with circuitry configuration in order to reduce the modem data consumption.

For a voice call a modem might only need to process data in the order of 10 kbps, which is 15000 times below the peak device processing capability. The ratio between predicted peak processing capability for some modem use cases and device peak data rates is even larger for higher LTE device capabilities. This imbalance between predicted worst-case data rates and peak data rates is expected to increase even further for 5th Generation (5G) technology, where peak data capabilities could be of the order of 10 Gbits/s, which is six orders of magnitude (i.e., 1 million) times larger than the typical 10 kbit/s data rates required for voice communications.

These constraints are unnecessarily restrictive for many popular internet applications, which maintain a predictably low level of background data traffic and are designed to tolerate comparatively lengthy end-to-end delays in the transfer of larger volumes of data. In such scenarios, low latency and high instantaneous data rates are not necessary, and keeping the modem in a high state of alertness wastes battery power. This diminishes the user experience and ultimately reduces operator revenues by restricting the total time that the UE is available to communicate with the network.

In the existing art, network features such as discontinuous reception (DRX) and discontinuous transmission (DTX) are used to reduce the active duty cycle and thereby conserve power. Such techniques inevitably increase latency, but at the start of each reception period the modem must generally start up in its highest power state so that it can be immediately ready to receive data at the maximum rate if the control channel signals that active data is present. Provision is also made in the existing art to reduce device operating power in response to specific events, such as an increase in temperature or a low battery indication. In an alternative approach, a device can optionally terminate a communication if it detects that its power consumption exceeds a predetermined threshold. However, the network is generally in control of all the main operating parameters which affect the modem power consumption. As the modem is always required to be able to operate at the maximum capability of the device category under which it registered to the network, there is limited scope for the modem to actively manage its own power consumption to maximize battery life.

Moreover, thermal dissipation is increasingly becoming a problem in the highest-performance wireless modems, whether or not they are battery powered. It is likely that in the future some modems may only be able to offer maximum throughput for limited periods before the internal temperature rise becomes excessive to a point that it is necessary to constrain power usage to remain within operating temperature limits. If mitigation strategies for such problems are to be most effective, they should be driven by the device rather than the network, as the network cannot reasonably maintain a knowledge base of the thermal characteristics of every device on the market.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. Under the proposed method the modem can operate in one of a number of capability states with varying peak data processing capability and varying power demands. Inside the modem, individual temporary capability states may be determined by a large number of settings including, for example and not limited to, the voltage/frequency configurations applied to modem subsystems, bias currents in the transceiver affecting its linearity, search space in the PDCCH decoder, operating bandwidth of the device, or changes to the number of resources (e.g., Viterbi decoders, turbo decoders, SW processor cores) of a given type that can be active simultaneously. Outside the modem, the capability associated with the current modem state would be known by the network, which would constrain communication with the modem to operate within the applicable modem capability limits. A change of temporary capability state can be initiated either by the network or the modem, and signaling is used to ensure that the modem capability is not exceeded during the state transition. This allows the modem to save power by operating at below-peak capability when higher capability is not needed.

In one aspect, a processor of a communication apparatus with time-varying peak processing capability during active operations may negotiate a wireless network to which the communication apparatus is communicatively connected to select one of a plurality of temporary capability states ranging between zero and peak performance of the communication apparatus. The processor may also initiate a capability state change such that the communication apparatus enters the selected temporary capability state of the plurality of temporary capability states from a current temporary capability state of the plurality of temporary capability states. A lifetime of the selected temporary capability state may exceed a control information period used by the wireless network to dynamically schedule data transmissions with the communication apparatus. The data transmissions between the communication apparatus and the wireless network may be constrained according to the selected temporary capability state.

In another aspect, an apparatus may include a transceiver and a processor coupled to the transceiver. The transceiver may be capable of wirelessly communicating with a network. The processor may be capable of determining a need to adjust a maximum capability of the apparatus. The processor may also be capable of adjusting the maximum capability of the apparatus responsive to the determining.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 10 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
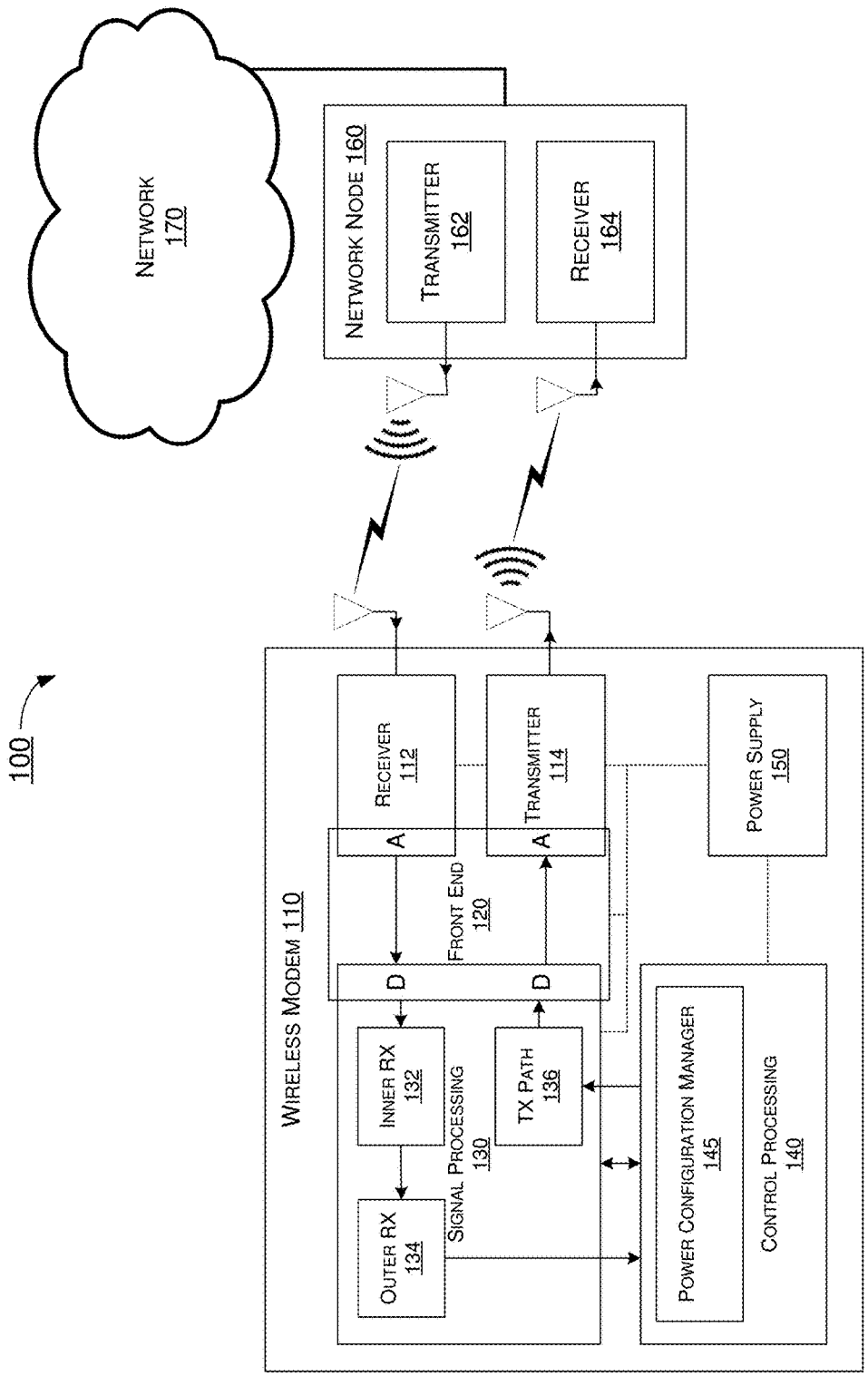
FIG. 1 is a diagram depicting an example network environment under schemes in accordance with implementations of the present disclosure.

FIG. 1 illustrates an example network environment 100 under schemes in accordance with implementations of the present disclosure. Referring to FIG. 1, network environment 100 involves a wireless modem 110 in wireless communications with a wireless network node 160 which is a part of network 170. Wireless modem 110 may include one or more radio receivers (shown as "receiver 112" in FIG. 1), capable of receiving wireless/RF signals and data over a communication channel from one or more remote transmitters (shown as "transmitter 162" in FIG. 1) of network node 160. Wireless modem 110 may also include one or more radio transmitters (shown as "transmitter 114" in FIG. 1), capable of transmitting wireless/RF signals and data over a communication channel to one or more receivers (shown as "receiver 164" in FIG. 1) of network node 160. Wireless modem 110, being portable, may be powered by a power supply 150 which may be a rechargeable battery. Wireless modem 110 may also include a signal processing subsystem 130 containing an inner receiver (RX) 132 which demodulates the received signal and performs measurements on it, an outer RX 134 which performs decoding and error correction to separate the wanted portion of the signal from signal impairments that arise from the non-ideal nature of the communication channel, and a transmit (TX) path 136 which produces digital samples representing the transmitted signals and data. Wireless modem 110 may also include a front end subsystem 120, parts of which may be implemented in receiver 112, the transmitter 114 and/or signal processing subsystem 130 (depending on actual implementation of the internal architecture of wireless modem 110). Front end subsystem 120 performs filtering and signal conversion between digital (indicated by "D" in FIG. 1) and analog (indicated by "A" in FIG. 1) forms.

Wireless modem 110 may further include a control processing subsystem 140, which manages the flow of data through wireless modem 110. Control processing subsystem 140 separates signaling data from user data and handles wireless network protocols. In modern modem designs, each of front end subsystem 120, signal processing subsystem 130 and control processing subsystem 140, although specified for maximum performance within a defined capability class, can be designed with a number of power saving modes of operation to provide reduced power consumption generally at the expense of some performance parameter. Control processing subsystem 140 may include a power configuration manager 145 to keep track of the power states of each of the subsystems.

Currently, a network can configure periods when it will not transmit data to wireless modems, thus allowing a modem to switch off its receive path (e.g., DRX) during such periods to save power. The modem is essentially passive in this process, although signaling from the modem is permissible to indicate preferred DRX parameters to the network. In a similar way, the modem can switch off its transmit path (e.g., DTX) to save power when it has nothing to transmit. Nevertheless, it remains the case that, at the start of an active reception period, the data to be received can be transmitted using any modulation or coding scheme up to the maximum capability class that the modem can support. Until the control channel has been decoded, the modem needs to capture the receive data speculatively, assuming that maximum throughput conditions might apply. Consequently, any power state changes that restrict modem capability needs to be postponed until after control channel decoding is complete. Such power state changes may include, for example and without limitation, adjusting a clock frequency, adjusting a supply voltage, and/or modifying a bias current to vary a linearity specification in a transceiver element. Thus, in circumstances where a user does not require the ultimate performance that the modem can deliver, additional power saving may be achieved when a reduced modem capability can be agreed upon with the network.

Figure 5:
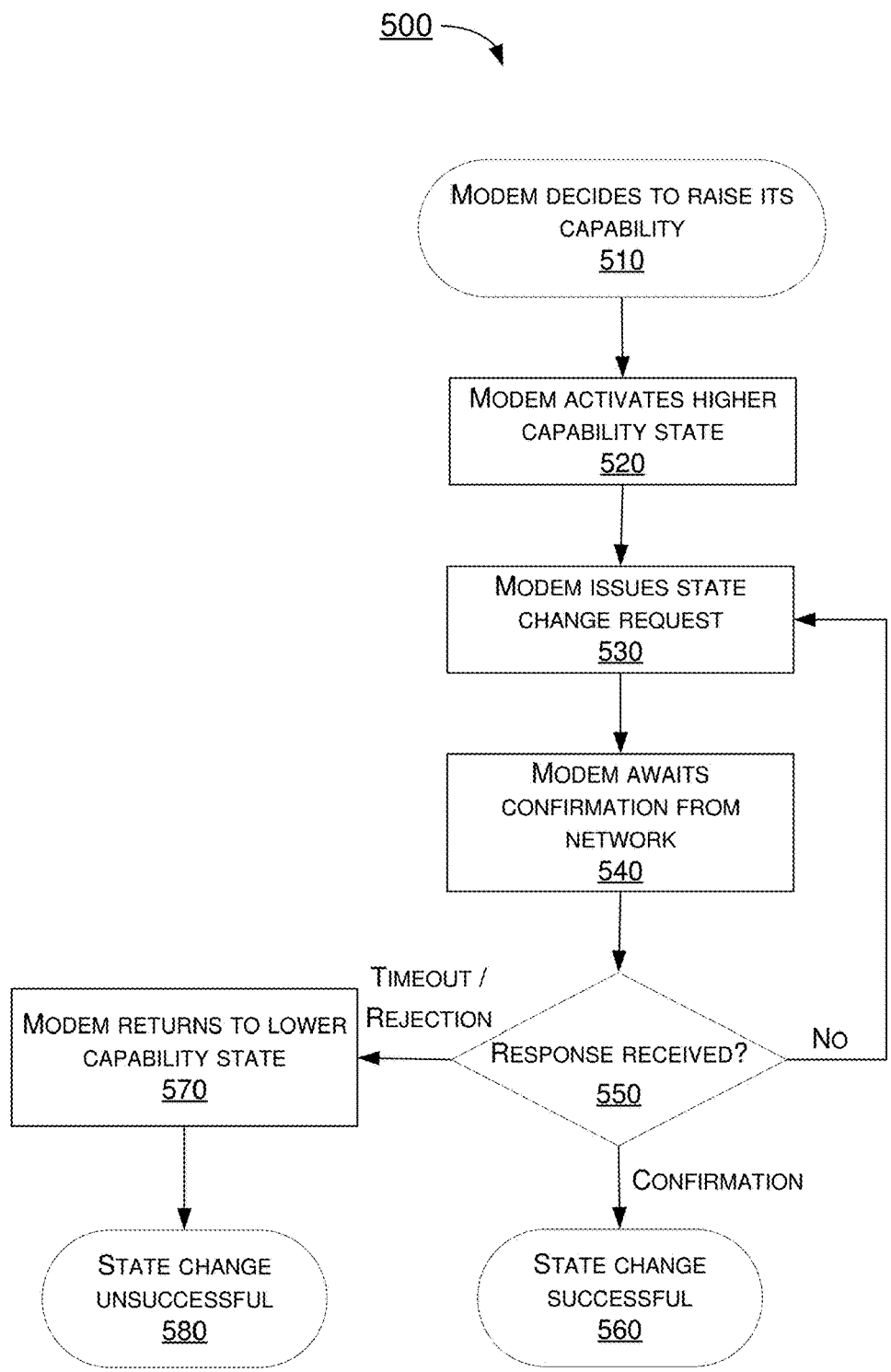
FIG. 5 is a diagram depicting an example process of modem-initiated capability addition in accordance with an implementation of the present disclosure.
Figure 6:
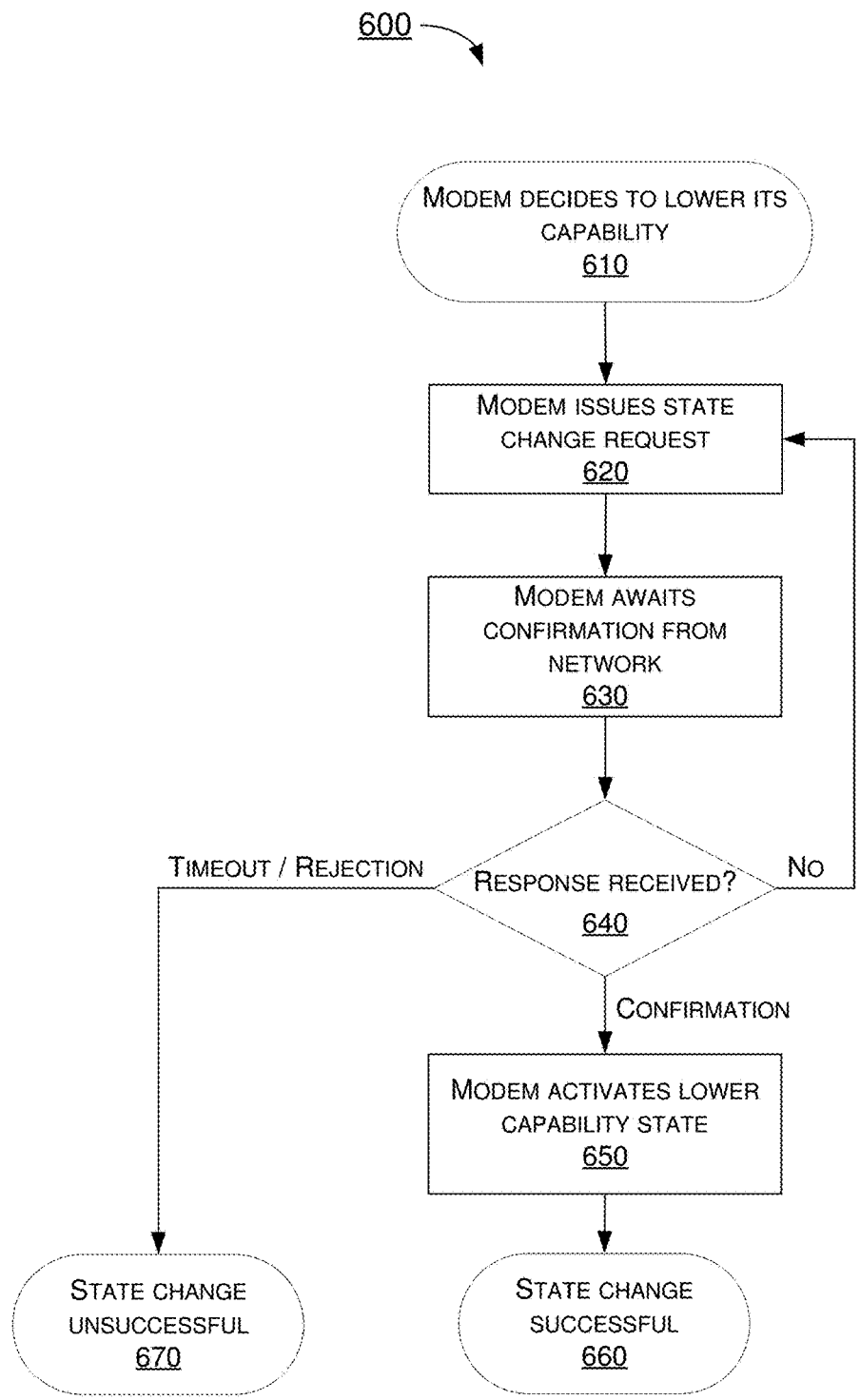
FIG. 6 is a diagram depicting an example process of modem-initiated capability reduction in accordance with an implementation of the present disclosure.
Figure 7:
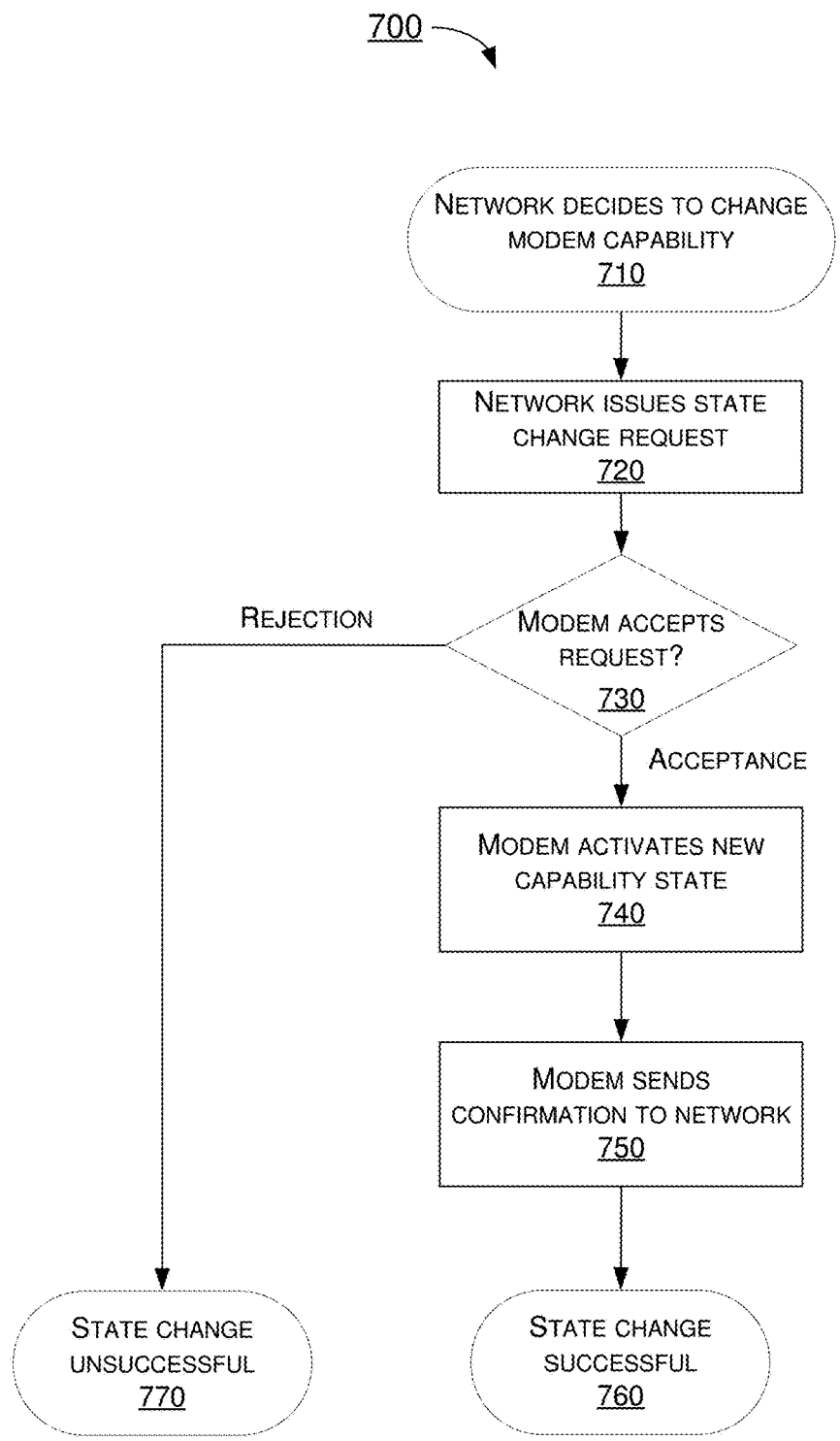
FIG. 7 is a diagram depicting an example process of network-initiated capability change in accordance with an implementation of the present disclosure.

Under a proposed scheme of the present disclosure, a wireless modem may inform a network when it wishes to enter a power saving state that will reduce its capabilities. Under a proposed scheme of the present disclosure, the network may inform a modem, which is operating below its device class capability, when increased performance is required. FIG. 5-FIG. 7 provide illustrative examples to show how the proposed schemes may be applied in practical scenarios.

Figure 2:
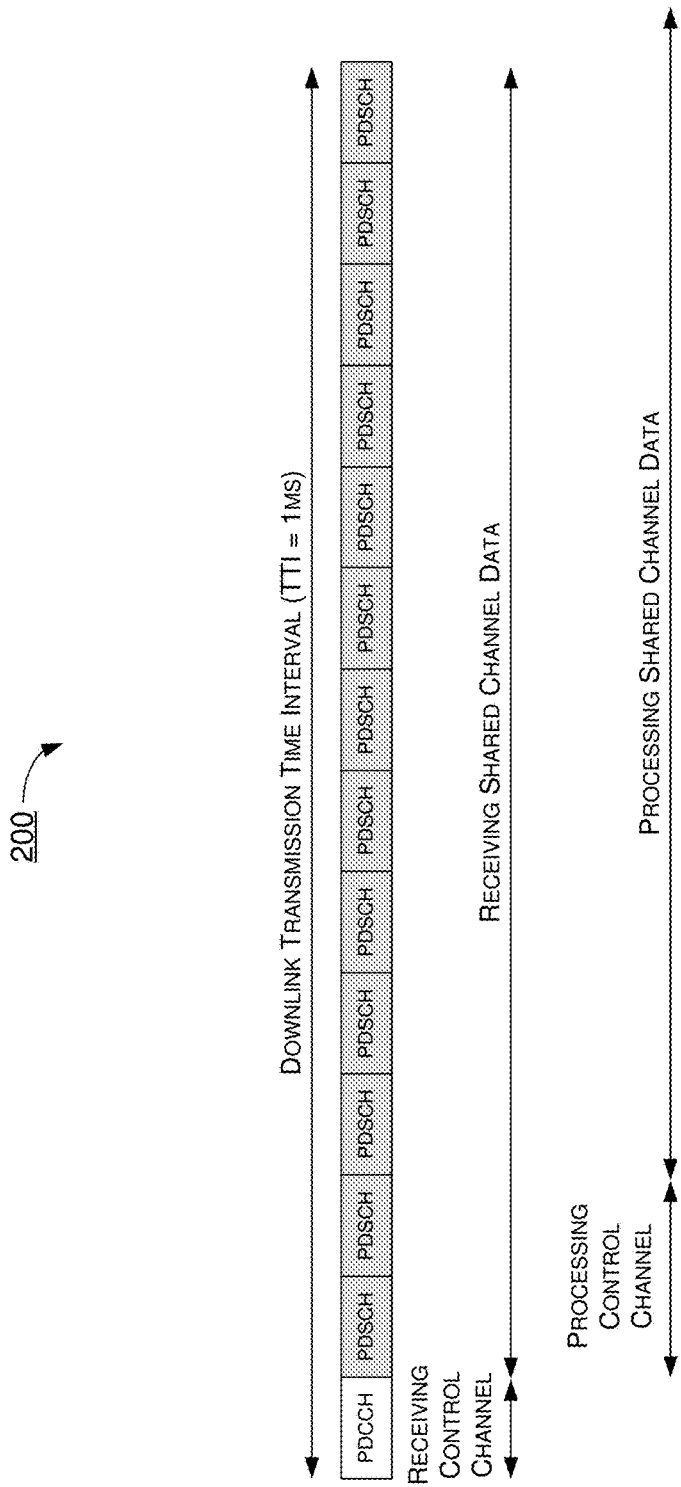
FIG. 2 is a diagram depicting control channel signaling in an LTE network.

FIG. 2 illustrates control channel signaling in an LTE network. Referring to FIG. 2, in an LTE network as currently specified, the first symbol(s) of a transmission time interval are used for the control channel (PDCCH) which carries information indicating which symbols and resources in the subsequent transmission of shared channel data (Physical Downlink Shared Channel (PDSCH)) carrying data intended for the receiving modem, as well as indicating which modulation schemes have been used. Since it takes time to process the control channel information, PDSCH reception has already started by the time the information has been decoded. Thus, the modem is required to maintain all its resources in a state of readiness to process data at up to the maximum rate.

Figure 3:
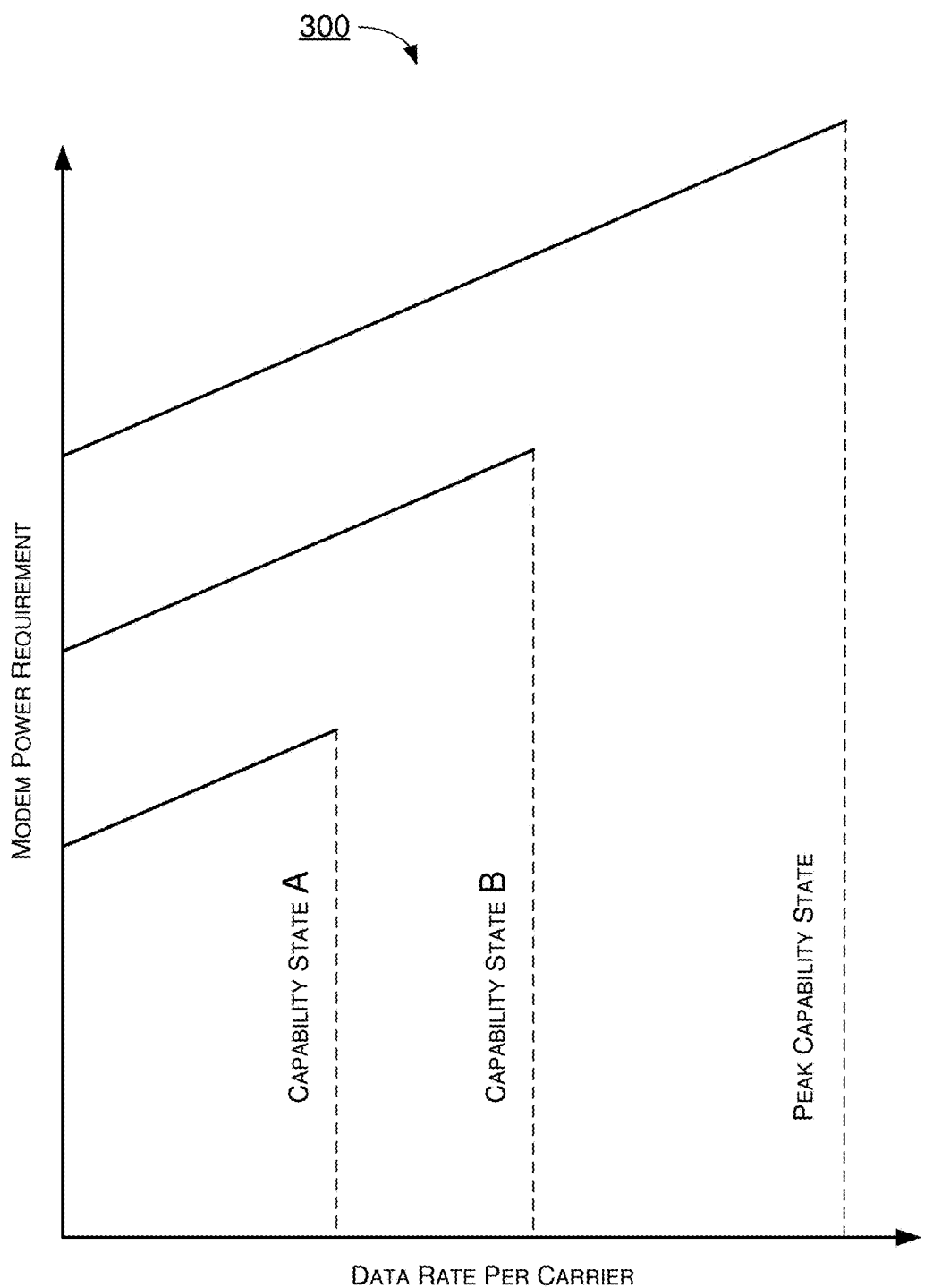
FIG. 3 is a diagram depicting power requirements versus performance for different capability states.

FIG. 3 illustrates power requirements versus performance for different capability states. As shown in FIG. 3, a higher state capability in a modem corresponds to a higher data rate per carrier and requires higher power requirement. Given a modem with capability states as shown FIG. 3 (e.g., capability state A, capability state B and peak capability state, in an ascending order), the modem needs to use the peak capability state under current 3GPP specification. As a result, power consumption by the modem is likely increased beyond what might be necessary.

Figure 4:
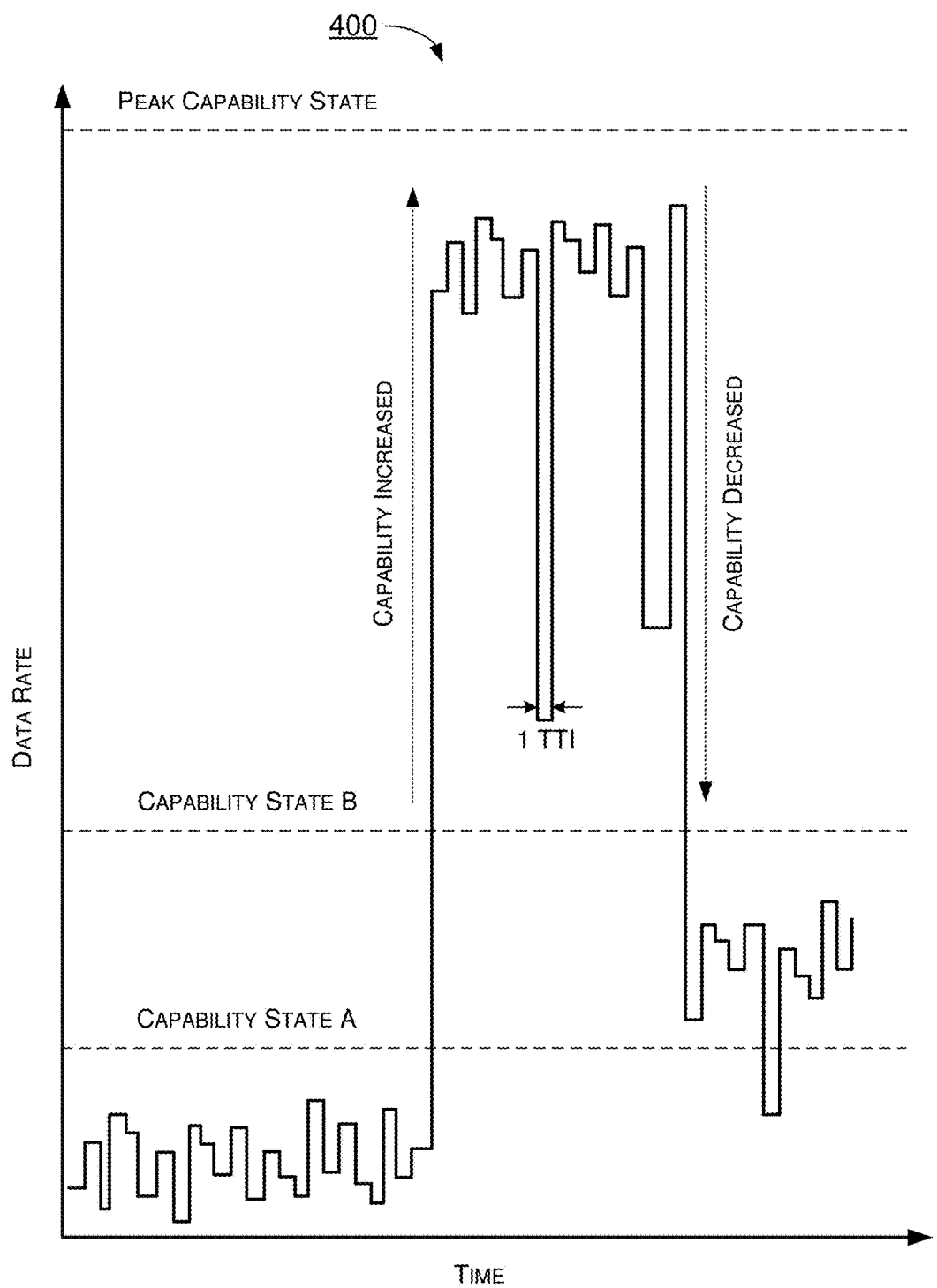
FIG. 4 is a diagram depicting switching between capability states to reduce power consumption in accordance with an implementation of the present disclosure.

FIG. 4 illustrates switching between capability states to reduce power consumption in accordance with an implementation of the present disclosure. Referring to FIG. 4, under a proposed scheme, a modem may negotiate with a network to enter a temporary lower capability state (e.g., capability state A), and the network may maintain data rate within agreed limit(s) for the lower capability state. Moreover, as higher volumes of data for the modem arrive, the network may instruct the modem to increase its capability state (e.g., capability state B or peak capability state) before the network transmit the data to the modem at a higher data rate. Furthermore, when data transmission at the higher data rate is complete, the modem may request to enter a lower capability state (e.g., capability state B) to conserve power. Advantageously, this allows the modem to use its power resources more efficiently when peak performance is not needed to satisfy its application requirements.

Under a proposed scheme of the present disclosure, the various types of functionality, such as video, e-mail and voice, supported by an LTE mobile device or UE may be mapped onto different power states. For instance, as the functionality of e-mail is typically associated with the characteristics of low data rates, random arrival time and long latency, such functionality may be mapped to a low capability state. Also, as the functionality of voice is typically associated with the characteristics of low data rates, predictable arrival time and short latency, such functionality may be mapped to a medium capability state. Moreover, as the functionality of video is typically associated with the characteristics of high data rates, random arrival time and medium latency, such functionality may be mapped to a high capability state.

For operation at lower data rates, the modem may implement a temporary capability state in which the modem can save power by reducing its internal clock rates and core voltage supply. However, in this temporary capability state, the reduced processing capacity could make the modem unable to handle video rate data traffic. It may be desirable for the modem to be treated as an LTE category 1 device, even if the modem is category 6 capable when operating at a higher core voltage and clock rate. To minimize its power consumption, the modem may operate a long DRX cycle or idle with periodic wakeups for e-mail, but may switch to a short DRX cycle when voice was active to meet the reduced latency requirement. The rate of change in temporary capability state typically exceeds 200 ms, and is therefore much slower than the scheduling rate dictated by one TTI, which is 1 ms.

When video functionality is activated by either the user or the network, the modem may increase its core voltage and clock rate, then signal a temporary capability state change to the network, which subsequently communicates with the modem as a category 6 device. When the video activity terminates, another temporary capability state change is signaled by the modem to the network and, upon acknowledgment by the network, category 1 communication may be resumed and the modem may return to a lower capability state to conserve power. The rate of change in temporary capability state typically exceeds 200 ms, and is therefore much slower than the scheduling rate dictated by one TTI (1 ms).

In some implementations in accordance with the present disclosure, the temporary change in capability state in a modem may be accomplished under existing specifications by de-registering and re-registering the modem each time a capability change is required. However, there are some limitations. Firstly, the process involves a break in connectivity, and the network is subsequently unaware whether a modem is registered as category 1 might be category 6 capable. Secondly, the low-power temporary capability state might require an undefined intermediate device category, having a subset of capabilities for one capability state but a superset of another. This may result in undesired additional signaling overhead to the network, as many steps that are part of the network authentication and registration process may need to be repeated unnecessarily.

In some implementations in accordance with the present disclosure, additional signaling is introduced for a modem to negotiate with a network a temporary change in maximum device capability. The change in maximum device capability may relate to, for example and without limitation, a change in peak data rate, a total allowable bandwidth to be processed by the modem, a number of active carriers, a maximum resource block allocation or highest modulation and coding scheme. This allows the modem to remain registered in its highest category while optimizing its energy consumption within the usage pattern required by current modem usage. As in the previous cases, the rate of change of the temporary capability state responds to changes in how a modem might be used, and will typically be at least one or two orders of magnitude slower than rate of reception of control information causing rapid changes to the modem processing requirements.

Illustrative and non-limiting examples of different types of state change are shown in FIG. 5, FIG. 6 and FIG. 7 as described below. Depending on the signaling protocol, acceptance of a state change request may be optional or mandatory.

FIG. 5 illustrates an example process 500 of modem-initiated capability addition in accordance with an implementation of the present disclosure. Process 500 may be implemented in network environment 100, as well as any network involving a wireless modem and a wireless network, to effect various features and/or aspects of the proposed concepts and schemes of the present disclosure. More specifically, process 500 may pertain to modem-initiated capability addition. Process 500 may include one or more operations, actions, or functions as represented by one or more of blocks 510, 520, 530, 540, 550, 560, 570 and 580. Although illustrated as discrete blocks, various blocks of process 500 may be divided into additional blocks, combined into fewer blocks, or eliminated, depending on the desired implementation. Process 500 may be implemented, whether completely or partially, by each of wireless modem 110 and wireless network node 160 described above as well as by each of communication apparatus 810 and network apparatus 820 described below. Solely for illustrative purposes and without limiting the scope, description of process 500 is provided below in the context of network environment 100. Process 500 may begin at 510.

At 510, wireless modem 110 may decide to raise it capability (e.g., from a lower capability state to a higher capability state). Process 500 may proceed from 510 to 520.

At 520, wireless modem 110 may activate a higher capability state. Process 500 may proceed from 520 to 530.

At 530, wireless modem 110 may issue or otherwise transmit a state change request to wireless network node 160. Process 500 may proceed from 530 to 540.

At 540, wireless modem 110 may wait for confirmation from wireless network node 160. Process 500 may proceed from 540 to 550.

At 550, wireless modem 110 may determine whether a positive response (e.g., confirmation) has been received from wireless network node 160. In an event that a confirmation is received from wireless network node 160, process 500 proceeds from 550 to 560 as the modem-initiated state change is successful and wireless modem 110 may remain in the higher capability state. Additionally, process 500 may also proceed from 550 to 530 for wireless modem 110 to continue to issue/transmit state change request to wireless network node 160. Otherwise, in an event that no confirmation is received (e.g., no confirmation received upon expiration or timeout of a counter) or a negative response (e.g., rejection) is received, process 500 proceeds from 550 to 570.

At 570, wireless modem 110 may return from the higher capability state to the lower capability state, and process 500 may proceed from 570 to 580 as the modem-initiated state change is unsuccessful.

FIG. 6 illustrates an example process 600 of modem-initiated capability reduction in accordance with an implementation of the present disclosure. Process 600 may be implemented in network environment 100, as well as any network involving a wireless modem and a wireless network, to effect various features and/or aspects of the proposed concepts and schemes of the present disclosure. More specifically, process 600 may pertain to modem-initiated capability reduction. Process 600 may include one or more operations, actions, or functions as represented by one or more of blocks 610, 620, 630, 640, 650, 660 and 670. Although illustrated as discrete blocks, various blocks of process 600 may be divided into additional blocks, combined into fewer blocks, or eliminated, depending on the desired implementation. Process 600 may be implemented, whether completely or partially, by each of wireless modem 110 and wireless network node 160 described above as well as by each of communication apparatus 810 and network apparatus 820 described below. Solely for illustrative purposes and without limiting the scope, description of process 600 is provided below in the context of network environment 100. Process 600 may begin at 610.

At 610, wireless modem 110 may decide to lower it capability (e.g., from a higher capability state to a lower capability state). Process 600 may proceed from 610 to 620.

At 620, wireless modem 110 may issue or otherwise transmit a state change request to wireless network node 160. Process 600 may proceed from 620 to 630.

At 630, wireless modem 110 may wait for confirmation from wireless network node 160. Process 600 may proceed from 630 to 640.

At 640, wireless modem 110 may determine whether a positive response (e.g., confirmation) has been received from wireless network node 160. In an event that a confirmation is received from wireless network node 160, process 600 proceeds from 640 to 650.

At 650, wireless modem 110 may activate the lower capability state, and process 500 may proceed from 650 to 660 as the modem-initiated state change is successful.

Otherwise, in an event that no confirmation is received (e.g., no confirmation received upon expiration or timeout of a counter) or a negative response (e.g., rejection) is received, process 600 proceeds from 640 to 670 as the modem-initiated state change is unsuccessful. Additionally, process 500 may also proceed from 640 to 620 for wireless modem 110 to continue to issue/transmit state change request to wireless network node 160.

FIG. 7 illustrates an example process 700 of network-initiated capability change in accordance with an implementation of the present disclosure. Process 700 may be implemented in network environment 100, as well as any network involving a wireless modem and a wireless network, to effect various features and/or aspects of the proposed concepts and schemes of the present disclosure. More specifically, process 700 may pertain to network-initiated capability change. Process 700 may include one or more operations, actions, or functions as represented by one or more of blocks 710, 720, 730, 740, 750, 760 and 770. Although illustrated as discrete blocks, various blocks of process 700 may be divided into additional blocks, combined into fewer blocks, or eliminated, depending on the desired implementation. Process 700 may be implemented, whether completely or partially, by each of wireless modem 110 and wireless network node 160 described above as well as by each of communication apparatus 810 and network apparatus 820 described below. Solely for illustrative purposes and without limiting the scope, description of process 700 is provided below in the context of network environment 100. Process 700 may begin at 710.

At 710, wireless network node 160 may decide to change the modem capability of wireless modem 110. Process 700 may proceed from 710 to 720.

At 720, wireless network node 160 may issue or otherwise transmit a state change request to wireless modem 110. Process 700 may proceed from 720 to 730.

At 730, wireless modem 110 may determine whether to accept the request. In an event of a positive determination (e.g., acceptance), process 700 may proceed from 730 to 740. Otherwise, in an event of a negative determination (e.g., rejection), process 700 may proceed from 730 to 770 as the network-initiated state change is unsuccessful.

At 740, wireless modem 110 may activate a new capability state, which may be a lower or higher state than its current capability state. Process 700 may proceed from 740 to 750.

At 750, wireless modem 110 may send or otherwise transmit a confirmation to wireless network node 160 to indicate and confirm the state change, and process 700 may proceed from 750 to 760 as the network-initiated state change is successful.

Under a proposed scheme of the present disclosure, thermal sensing in the modem may be utilized to monitor the temperature of one or more system components of the modem. If the temperature rises above a predetermined threshold (e.g., possibly due to sustained operation at or near peak throughput), the modem may initiate a switch to a lower temporary capability state for a period to allow its temperature to return to a safe operating level. In such cases, the modem may perform a modem-initiated capability reduction process similar to that depicted in FIG. 6. Alternatively, due to safety, the modem may automatically switch to a lower capability state without or before obtaining confirmation from the network.

Under a proposed scheme of the present disclosure, when a user of the modem selects a battery preservation mode or when battery sensing indicates that remaining battery capacity has fallen below a threshold, the modem may initiate a switch to its lowest temporary capability state and may only leave that state in response to a request from the user. In such cases, the modem may perform a modem-initiated capability reduction process similar to that depicted in FIG. 6. Alternatively, the modem may automatically switch to a lower capability state without or before obtaining confirmation from the network.

In some implementations, a modem having a choice of bands or modes in which it could operate can preferentially select the band and mode that maximize the efficiency of its transceiver. In some implementations, the modem may adjust its temporary capability state to match the requirements of the active applications on its applications processor.

In some implementations, when the modem is an LTE modem, the modem may signal its preferred temporary capability state(s) to an LTE network by extending the range of the powerPrefIndication enumeration in a UEAssistanceInformation message. The information about the preferred temporary capability state(s) may also be signaled in the AS-Context field of a HandoverPreparationInformation message so that the temporary capability state(s) may be communicated to a new eNB during handover. The capabilities of each state may then be defined by using the powerPrefIndication to index into a list of capability sets in the UE-EUTRA-Capability indication. New signaling may be needed for the network or modem to confirm a temporary capability state change, and for a network-initiated temporary capability state change. An additional entry in the UE-EUTRA-Capability field may be needed to indicate whether or not a modem supports this capability.

Illustrative Implementations

Figure 8:
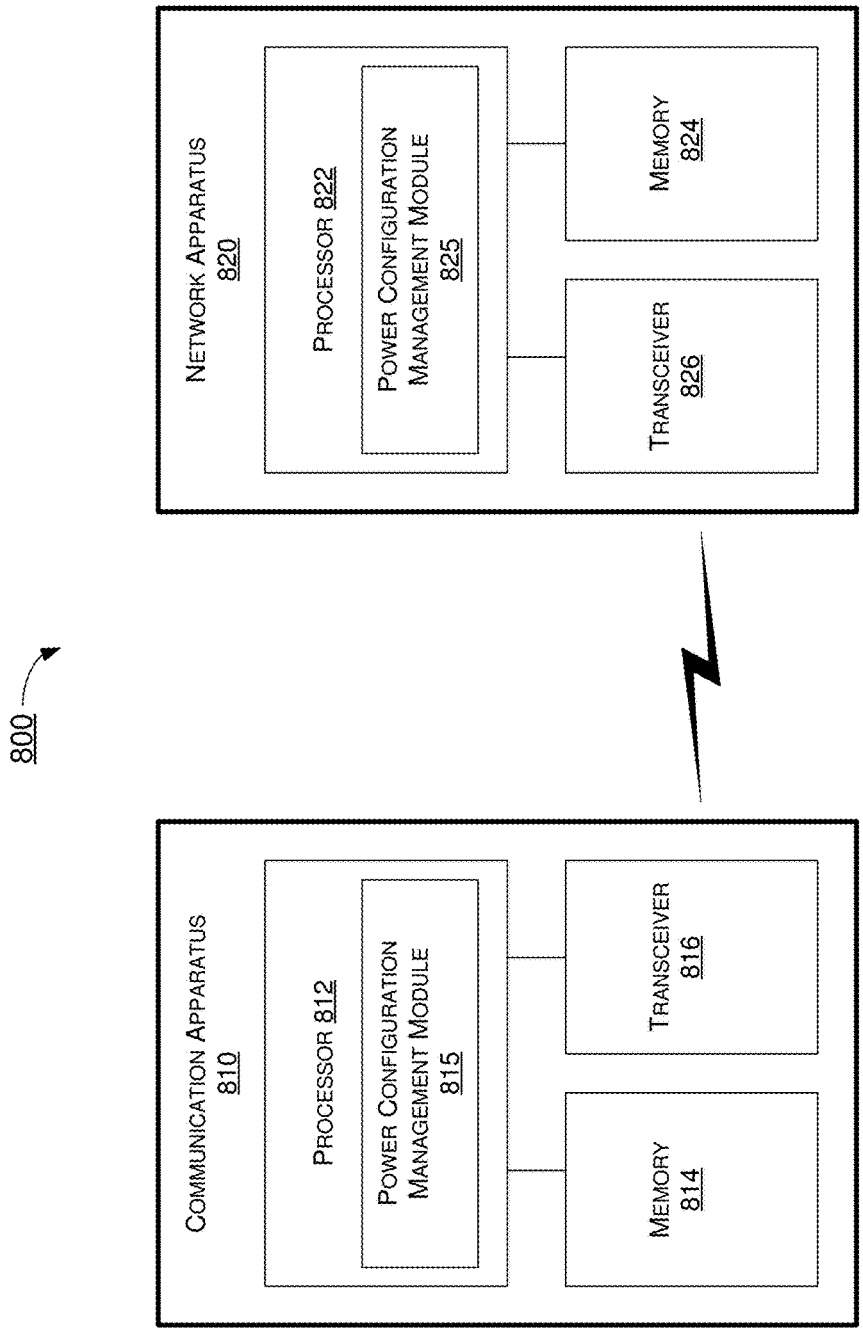
FIG. 8 is a block diagram of an example communication apparatus and an example network apparatus in accordance with an implementation of the present disclosure.

FIG. 8 illustrates an example communication apparatus 810 and an example network apparatus 820 in accordance with an implementation of the present disclosure. Each of communication apparatus 810 and network apparatus 820 may perform various functions to implement schemes, techniques, processes and methods described herein pertaining to device-driven power scaling in advanced wireless modem architectures, including processes 500, 600 and 700 described above as well as processes 900 and 1000 described below.

Communication apparatus 810 may be a part of an electronic apparatus, which may be a UE such as a portable or mobile apparatus, a wearable apparatus, a wireless communication apparatus or a computing apparatus. For instance, communication apparatus 810 may be implemented in a smartphone, a smartwatch, a personal digital assistant, a digital camera, or a computing equipment such as a tablet computer, a laptop computer or a notebook computer. Communication apparatus 810 may also be a part of a machine type apparatus, which may be an Internet-of-Things (IoT) apparatus such as an immobile or a stationary apparatus, a home apparatus, a wire communication apparatus or a computing apparatus. For instance, communication apparatus 810 may be implemented in a smart thermostat, a smart fridge, a smart door lock, a wireless speaker or a home control center. Alternatively, communication apparatus 810 may be implemented in the form of one or more integrated-circuit (IC) chips such as, for example and without limitation, one or more single-core processors, one or more multi-core processors, or one or more complex-instruction-set-computing (CISC) processors. In processes 500, 600, 700, 900 and 1000, communication apparatus 810 may be implemented in or as wireless modem 110 or a UE. Communication apparatus 810 may include at least some of those components shown in FIG. 8 such as a processor 812, for example. Communication apparatus 810 may further include one or more other components not pertinent to the proposed scheme of the present disclosure (e.g., internal power supply, display device and/or user interface device), and, thus, such component(s) of communication apparatus 810 are neither shown in FIG. 8 nor described below in the interest of simplicity and brevity.

Network apparatus 820 may be a part of an electronic apparatus, which may be a network node such as a base station, a small cell, a router or a gateway. For instance, network apparatus 820 may be implemented in an eNodeB in a LTE, LTE-Advanced or LTE-Advanced Pro network or in a gNB in a 5G, New Radio (NR) or IoT network. Alternatively, network apparatus 820 may be implemented in the form of one or more IC chips such as, for example and without limitation, one or more single-core processors, one or more multi-core processors, or one or more CISC processors. In processes 500, 600, 700, 900 and 1000, network apparatus 820 may be implemented in or as wireless network node 160 or an eNB. Network apparatus 820 may include at least some of those components shown in FIG. 8 such as a processor 822, for example. Network apparatus 820 may further include one or more other components not pertinent to the proposed scheme of the present disclosure (e.g., internal power supply, display device and/or user interface device), and, thus, such component(s) of network apparatus 820 are neither shown in FIG. 8 nor described below in the interest of simplicity and brevity.

In one aspect, each of processor 812 and processor 822 may be implemented in the form of one or more single-core processors, one or more multi-core processors, or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including device-driven power scaling in advanced wireless modem architectures in accordance with various implementations of the present disclosure.

In some implementations, communication apparatus 810 may also include a transceiver 816 coupled to processor 812 and capable of wirelessly transmitting and receiving data. In some implementations, communication apparatus 810 may further include a memory 814 coupled to processor 812 and capable of being accessed by processor 812 and storing data therein. In some implementations, network apparatus 820 may also include a transceiver 826 coupled to processor 822 and capable of wirelessly transmitting and receiving data. In some implementations, network apparatus 820 may further include a memory 824 coupled to processor 822 and capable of being accessed by processor 822 and storing data therein. Accordingly, communication apparatus 810 and network apparatus 820 may wirelessly communicate with each other via transceiver 816 and transceiver 826, respectively. To aid better understanding, the following description of the operations, functionalities and capabilities of each of communication apparatus 810 and network apparatus 820 is provided in the context of a LTE/LTE-Advanced/LTE-Advanced Pro environment in which communication apparatus 810 is implemented in or as a communication apparatus or a UE and network apparatus 820 is implemented in or as a network node of a LTE/LTE-Advanced/LTE-Advanced Pro network.

The following description pertains to the operations, functionalities and capabilities of communication apparatus 810.

In some implementations, communication apparatus 810 may be a wireless modem with time-varying peak processing capability during active modem operation. That is, communication apparatus 810 may have a set of multiple temporary capability states intermediate between zero and peak performance thereof. A presently selected temporary capability state of communication apparatus 810 may be a result of negotiation with a network (e.g., with network apparatus 820 functioning as a wireless network node of the network, such as an eNB of an LTE network). The duration or lifetime for the selected temporary capability state may exceed the control information period used by the network to dynamically schedule data transmissions with communication apparatus 810. Data transmission between the network (e.g., network apparatus 820) and communication apparatus 810 may be constrained or otherwise limited according to the presently selected temporary capability state.

In some implementations, processor 812 of communication apparatus 810 may transmit, via transceiver 816, a request to the network (e.g., network apparatus 820) for a change of temporary capability state so that processor 812 can carry out operations for communication apparatus 810 to enter a preferred temporary capability state to either reduce its power consumption or increase its capability. Upon receiving a confirmation or permission from the network, processor 812 may carry out operations for communication apparatus 810 (e.g., by adjusting one or more operational parameters of communication apparatus 810) to enter the desired state changes.

In some implementations, processor 812 may change the temporary capability and power states of communication apparatus 810 in response to requests or instructions from network.

In some implementations, processor 812 may inform the network (e.g., by signaling the network) before processor 812 changes the temporary capability state of communication apparatus 810.

In some implementations, processor 812 may negotiate a preferred temporary capability state with the network. Moreover, processor 812 may inform the network when processor 812 decides to change the temporary capability state of communication apparatus 810.

In some implementations, processor 812 may be connected to a mesh, ad hoc or peer-to-peer wireless modem network via transceiver 816. In such cases, processor 812 may manage its own power states to control the power consumption of communication apparatus 810. Additionally, processor 812 may inform one or more other networked devices (e.g., other wireless modem(s) and/or UE(s)) of any accompanying changes to the temporary capability state of communication apparatus 810.

In some implementations, processor 812 may, by utilizing knowledge of system requirements of communication apparatus 810, determine which of the set of temporary capability states is preferred as allowing the optimal (e.g., least) power consumption within the constraints of the system requirements of communication apparatus 810.

In some implementations, processor 812 may, by utilizing knowledge of device thermal state, determine whether a non-preferred temporary capability state with lower power requirements is necessary to prevent excessive temperature increase or prolonged operation of communication apparatus 810 at a high temperature. Upon a positive determination, processor 812 may change the temporary capability state of communication apparatus 810 from a current capability state to a lower capability state. For instance, processor 812 may perform a modem-initiated capability reduction process similar to that depicted in FIG. 6. Alternatively, processor 812 may automatically switch to a lower capability state without or before obtaining confirmation from the network.

In some implementations, communication apparatus 810 may also include one or more sensors (not shown) capable of sensing environmental parameters such as temperature, humidity, atmospheric pressure and the like. In such cases, processor 812 may receive the device thermal state by receiving sensor data from the one or more sensors located within communication apparatus 810. Alternatively or additionally, processor 812 may determine the device thermal state based on recent and current device operating parameters and a thermal power model.

In some implementations, processor 812 may, by utilizing knowledge of residual battery capacity, identify a preferred temporary capability state among the set of temporary capability states which may maximize the remaining battery life.

In some implementations, processor 812 may, by utilizing user-defined settings, restrict the set of temporary capability states available to it. For instance, a user may input user-defined settings such that temporary capability state C out of a set of temporary capability states A, B and C is off limit. Accordingly, the states would be temporary capability states A and B.

In some implementations, processor 812 may, by utilizing knowledge of available network modes and/or frequency bands, select a network mode and/or frequency band to minimize power consumption of communication apparatus 810.

In some implementations, processor 812 may include a power configuration management module 815 that communicates with the wireless network, via transceiver 816, to handle transitions between capability and power states. Power configuration management module 815 may be an example implementation of power configuration manager 145 of wireless modem 110. In some implementations, processor 822 of network apparatus 820 may include a power configuration management module 825 that communicates with power configuration management module 815, via transceiver 826 and transceiver 816, to determine which temporary capability state of the set of temporary capability states to select for communication apparatus 810. Each of power configuration management module 815 and power configuration management module 825 may be implemented in hardware (e.g., one or more circuits), software, or a combination of both.

In some implementations, processor 812 may de-register from the network (e.g., network apparatus 820) and subsequently re-register with a different temporary capability state from its presented selected temporary capability state.

In some implementations, the set of temporary capability states may pertain to one or more aspects of communication apparatus 810, including, for example and without limitation: a peak/maximum receive (RX) data rate, a peak/maximum transmit (TX) data rate, an aggregated RX bandwidth, an aggregated TX bandwidth, maximum number of active RX carriers, a maximum number of active TX carriers, total allowable bandwidths to be processed by communication apparatus 810, a maximum resource block allocation, a highest modulation and coding scheme, a set of frequency bands for use, a number of active RX antennas, a number of active TX antennas, a maximum RX multiple-input and multiple-output (MIMO) order, a maximum TX MIMO order, a set of services required by an applications processor of communication apparatus 810 (e.g., processor 812 or another processor), a set of radio access technologies (RATs) that can be used by transceiver 816 to wirelessly transmit and receive data, and one or more processing requirements of processor 812 and/or the applications processor.

In some implementations, processor 812 may select a temporary capability state by effecting a change in the configured frequency of each of one or more internal clock signals. Alternatively or additionally, processor 812 may select the temporary capability state by effecting a change in the configured voltage on each of one or more system power supplies. Alternatively or additionally, processor 812 may select the temporary capability state by effecting a change in the number of resources (e.g., hardware components of communication apparatus 810) that are currently active.

Figure 9:
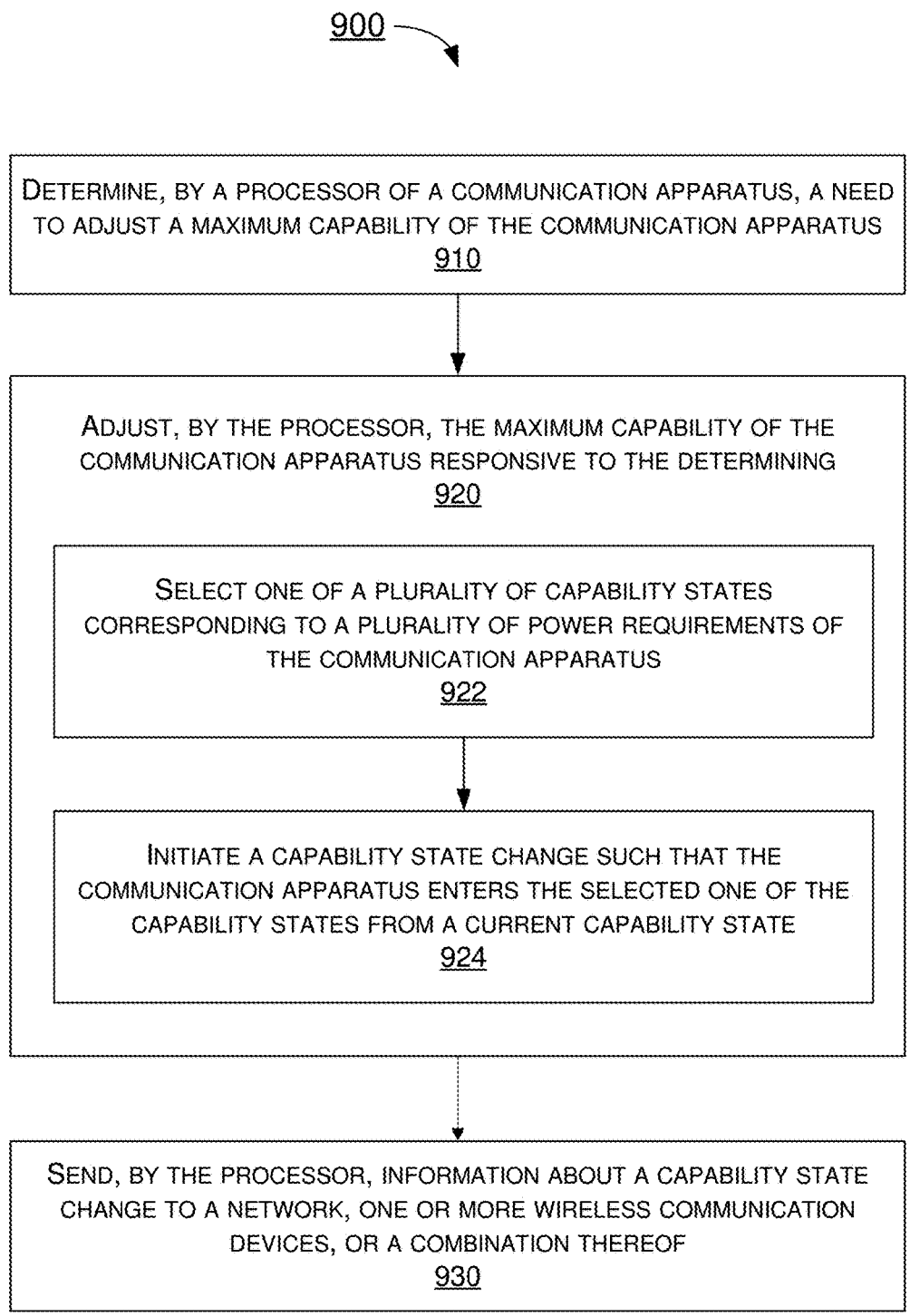
FIG. 9 is a flowchart of an example process in accordance with an implementation of the present disclosure.

FIG. 9 illustrates an example process 900 in accordance with an implementation of the present disclosure. Process 900 may be an example implementation of one, some or all of processes 500, 600 and 700, whether partially or completely, with respect to device-driven power scaling in advanced wireless modem architectures in accordance with the present disclosure. Process 900 may represent an aspect of implementation of features of communication apparatus 810. Process 900 may include one or more operations, actions, or functions as illustrated by one or more of blocks 910, 920 and 930, as well as sub-blocks 922 and 924. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order. Process 900 may be implemented by communication apparatus 810 or any suitable UE or machine type devices. Solely for illustrative purposes and without limitation, process 900 is described below in the context of communication apparatus 810. Process 900 may begin at block 910.

At 910, process 900 may involve processor 812 of communication apparatus 810 determining a need to adjust a maximum capability of communication apparatus 810. Process 900 may proceed from 910 to 920.

At 920, process 900 may involve processor 812 adjusting the maximum capability of communication apparatus 810 in response to the determining. Process 900 may proceed from 920 to 930.

At 930, process 900 may involve processor 812 sending, via transceiver 816, information about a capability state change to a network, one or more wireless communication devices, or a combination thereof.

In adjusting the maximum capability of communication apparatus 810, process 900 may involve processor 812 performing a number of operations such as those of sub-blocks 922 and 924.

At 922, process 900 may involve processor 812 selecting one of a plurality of capability states corresponding to a plurality of power requirements of communication apparatus 810. Process 900 may proceed from 922 to 924.

At 924, process 900 may involve processor 812 initiating a capability state change such that communication apparatus 810 enters the selected one of the capability states from a current capability state.

In some implementations, each of the plurality of capability states may be determined by more than one of a plurality of settings associated with communication apparatus 810. In some implementations, the plurality of settings may include the following: voltage and frequency configurations applied to subsystems of communication apparatus 810, bias currents in a transceiver of communication apparatus 810, a search space in a PDCCH decoder of communication apparatus 810, an operating bandwidth of communication apparatus 810, and a change to a number of resources of communication apparatus 810 (e.g., Viterbi decoders, turbo decoders and software processor cores of communication apparatus 810) of a given type that can be active simultaneously.

In some implementations, in determining the need to adjust the maximum capability of communication apparatus 810, process 900 may involve processor 812 receiving, via transceiver 816, an instruction to adjust the maximum capacity from a network with which communication apparatus 810 is communicatively connected (e.g., network apparatus 820 as a network node of a wireless network).

In some implementations, in determining the need to adjust the maximum capability of communication apparatus 810, process 900 may involve processor 812 receiving information from a network with which communication apparatus 810 is communicatively connected (e.g., network apparatus 820 as a network node of a wireless network). The information may indicate that communication apparatus 810 is operating below a device class capability of communication apparatus 810 when increased performance is required.

In some implementations, in adjusting the maximum capability of communication apparatus 810, process 900 may involve processor 812 performing a number of operations. For instance, process 900 may involve processor 812 de-registering communication apparatus 810 from a network with which communication apparatus 810 is communicatively connected and registered with a first device capability class. Moreover, process 900 may involve processor 812 re-registering communication apparatus 810 with the network with a second device capability class different than the first device capability class.

In some implementations, in determining the need to adjust the maximum capability of communication apparatus 810, process 900 may involve processor 812 determining a thermal state of communication apparatus 810. Moreover, in selecting the one of the plurality of capability states, process 900 may involve processor 812 selecting a non-preferred capability state with a lower power requirement to prevent a temperature increase in communication apparatus 810 responsive to the determining of the thermal state.

In some implementations, in determining the thermal state of communication apparatus 810, process 900 may involve processor 812 performing either or both of the following: (1) receiving sensor data from one or more sensors disposed within communication apparatus 810; and (2) determining the thermal state based on recent and current operating parameters of communication apparatus 810 and a thermal power model.

In some implementations, in selecting the one of the plurality of capability states, process 900 may involve processor 812 selecting, based on information of residual battery capacity of a battery of communication apparatus 810, a preferred capability state allowing a longer battery life than that allowed by other capability states of the plurality of capability states.

In some implementations, in selecting the one of the plurality of capability states, process 900 may involve processor 812 selecting, based on information of available network modes, available frequency bands, or both, a preferred capability state that minimizes power consumption compared to other capability states of the plurality of capability states.

In some implementations, in selecting the one of the plurality of capability states, process 900 may involve processor 812 performing a number of operations. For instance, process 900 may involve processor 812 receiving a user input for one or more user-defined settings. Moreover, process 900 may involve processor 812 restricting the selecting to a subset of capability states of the plurality of capability states based on the user-defined settings.

In some implementations, in selecting the one of the plurality of capability states, process 900 may involve processor 812 adjusting one or more of the following: (1) one or more frequencies of one or more internal clock signals of communication apparatus 810; (2) one or more configured voltages on one or more system power supplies of communication apparatus 810; and (3) a number of resources of communication apparatus 810 that are currently active.

In some implementations, in initiating the capability state change, process 900 may involve processor 812 performing a number of operations. For instance, process 900 may involve processor 812 sending a state change request to a network with which communication apparatus 810 is communicatively connected. Additionally, process 900 may involve processor 812 receiving a confirmation from the network. Moreover process 900 may involve processor 812 initiating the capability state change responsive to the receiving of the confirmation.

In some implementations, the plurality of capability states may pertain to more than one of a plurality of aspects of communication apparatus 810. The plurality of aspects of communication apparatus 810 may include the following: a peak receive (RX) data rate, a peak transmit (TX) data rate, an aggregated RX bandwidth, an aggregated TX bandwidth, a maximum number of active RX carriers, a maximum number of active TX carriers, total allowable bandwidths to be processed by communication apparatus 810, a maximum resource block allocation, a highest modulation and coding scheme, a set of frequency bands for use, a number of active RX antennas, a number of active TX antennas, a maximum RX multiple-input and multiple-output (MIMO) order, a maximum TX MIMO order, a set of services required by an applications processor of communication apparatus 810, a set of radio access technologies (RATs) that can be used by a transceiver of communication apparatus 810 to wirelessly transmit and receive data, and one or more processing requirements of the applications processor.

FIG. 10 illustrates an example process 1000 in accordance with an implementation of the present disclosure. Process 1000 may be an example implementation of one, some or all of processes 500, 600 and 700, whether partially or completely, with respect to device-driven power scaling in advanced wireless modem architectures in accordance with the present disclosure. Process 1000 may represent an aspect of implementation of features of communication apparatus 810. Process 1000 may include one or more operations, actions, or functions as illustrated by one or more of blocks 1010, 1020 and 1030, as well as sub-blocks 1022 and 1024. Although illustrated as discrete blocks, various blocks of process 1000 may be divided into additional blocks, combined into fewer blocks, or eliminated, depending on the desired implementation. Moreover, the blocks of process 1000 may executed in the order shown in FIG. 10 or, alternatively, in a different order. Process 1000 may be implemented by communication apparatus 810 or any suitable UE or machine type devices. Solely for illustrative purposes and without limitation, process 1000 is described below in the context of communication apparatus 810. Process 1000 may begin at block 1010.

At 1010, process 1000 may involve processor 812 of communication apparatus 810 negotiating with a wireless network (e.g., network 170 via network node 160 which may be implemented by network apparatus 820) to which communication apparatus 810 is communicatively connected to select one of a plurality of temporary capability states ranging between zero and peak performance of communication apparatus 810, which may have time-varying peak processing capability during active operations. Process 1000 may proceed from 1010 to 1020.

At 1020, process 1000 may involve processor 812 initiating a capability state change such that communication apparatus 810 enters the selected temporary capability state of the plurality of temporary capability states from a current temporary capability state of the plurality of temporary capability states. Moreover, a lifetime of the selected temporary capability state may exceed a control information period used by the wireless network to dynamically schedule data transmissions with communication apparatus 810. Additionally, the data transmissions between communication apparatus 810 and the wireless network may be constrained according to the selected temporary capability state.

In some implementations, in negotiating with the wireless network (e.g., network apparatus 820) to select one of the plurality of temporary capability states, process 1000 may involve processor 812 determining a need to change from the current temporary capability state to another one of the plurality of temporary capability states to reduce power consumption or to increase processing capability of communication apparatus 810. Additionally, process 1000 may involve processor 8112 requesting, via transceiver 816, permission from the wireless network for a change of capability state. Moreover, process 1000 may involve processor 812 receiving, via transceiver 816, a permission from the wireless network for the change of capability state. In such cases, in initiating the capability state change, process 1000 may involve processor 812 initiating the capability state change responsive to receiving the permission.

In some implementations, in negotiating with the wireless network (e.g., network apparatus 820) to select one of the plurality of temporary capability states, process 1000 may involve processor 812 receiving, via transceiver 816, a request or instruction from the wireless network for a change of capability state. In such cases, in initiating the capability state change, process 1000 may involve processor 812 initiating the capability state change responsive to receiving the request or instruction.

In some implementations, in negotiating with the wireless network (e.g., network apparatus 820) to select one of the plurality of temporary capability states, process 1000 may involve processor 812 determining a need to change from the current temporary capability state to another one of the plurality of temporary capability states. Moreover, process 1000 may involve processor 812 informing the wireless network regarding a change of capability state for communication apparatus 810. In such cases, in initiating the capability state change, process 1000 may involve processor 812 initiating the capability state change responsive to the determining.

In some implementations, in negotiating with the wireless network (e.g., network apparatus 820) to select one of the plurality of temporary capability states, process 1000 may involve processor 812 selecting a preferred temporary capability state from the plurality of temporary capability states. Additionally, process 1000 may involve processor 812 negotiating with the wireless network to obtain permission from the wireless network to change from the current temporary capability state to the preferred temporary capability state. Furthermore, process 1000 may involve processor 812 informing the wireless network regarding a change of capability state for communication apparatus 810 from the current temporary capability state to the preferred temporary capability state.

In some implementations, in negotiating with the wireless network (e.g., network apparatus 820) to select one of the plurality of temporary capability states, process 1000 may involve processor 812 identifying, using information of device requirements of communication apparatus 810, a preferred temporary capability state from the plurality of temporary capability states as providing a best power consumption within constraints of the device requirements compared to other ones of the plurality of temporary capability states. Moreover, process 1000 may involve processor 812 selecting the preferred temporary capability state as the selected temporary capability state responsive to the identifying.

In some implementations, in negotiating with the wireless network (e.g., network apparatus 820) to select one of the plurality of temporary capability states, process 1000 may involve processor 812 determining, using information of a device thermal state of communication apparatus 810, whether a non-preferred temporary capability state of the plurality of temporary capability states with lower power requirements is needed to prevent excessive temperature increase. Additionally, process 1000 may involve processor 812 selecting the non-preferred temporary capability state as the selected temporary capability state responsive to a result of the determining. In some implementations, the information of the device thermal state may be derived from sensor data received from one or more sensors located within communication apparatus 810. Alternatively, the information of the device thermal state may be derived from recent and current device operating parameters of communication apparatus 810 and a thermal power model.

In some implementations, in negotiating with the wireless network (e.g., network apparatus 820) to select one of the plurality of temporary capability states, process 1000 may involve processor 812 identifying, using information of residual capacity of a battery of communication apparatus 810, a preferred temporary capability state from the plurality of temporary capability states as providing a maximum amount of remaining battery life of the battery compared to other ones of the plurality of temporary capability states. Moreover, process 1000 may involve processor 812 selecting the preferred temporary capability state as the selected temporary capability state responsive to the identifying.

In some implementations, in negotiating with the wireless network (e.g., network apparatus 820) to select one of the plurality of temporary capability states, process 1000 may involve processor 812 identifying, using information of either or both of available network modes and available frequency bands, a preferred temporary capability state from the plurality of temporary capability states as minimizing power consumption of communication apparatus 810 compared to other ones of the plurality of temporary capability states. Additionally, process 1000 may involve processor 812 selecting the preferred temporary capability state as the selected temporary capability state responsive to the identifying.

In some implementations, in negotiating with the wireless network (e.g., network apparatus 820) to select one of the plurality of temporary capability states, process 1000 may involve power configuration management module 815 of processor 812 communicating, via transceiver 816, with the wireless network. In such cases, in initiating the capability state change, process 1000 may involve power configuration management module 815 handling transitions between the current temporary capability state and the selected temporary capability state and corresponding transitions between a first power state and a second power state of a plurality of power states of communication apparatus 810.

In some implementations, in negotiating with the wireless network (e.g., network apparatus 820) to select one of the plurality of temporary capability states, process 1000 may involve processor 812 communicating, via transceiver 816, with power configuration management module 825 of network apparatus 820 of the wireless network to select one of the plurality of temporary capability states.

In some implementations, in initiating the capability state change, process 1000 may involve processor 812 de-registering communication apparatus 810 from the wireless network (e.g., network apparatus 820) with which communication apparatus 810 is registered with a first device capability class. Additionally, process 1000 may involve processor 812 re-registering communication apparatus 810 with the wireless network with a second device capability class different than the first device capability class.

In some implementations, in initiating the capability state change, process 1000 may involve processor 812 adjusting one or more of the following: one or more frequencies of one or more internal clock signals of communication apparatus 810, one or more configured voltages on one or more system power supplies of communication apparatus 810, and a number of resources of communication apparatus 810 that are currently active.

In some implementations, the plurality of temporary capability states may pertain to a plurality of aspects of communication apparatus 810, which may include the following: a peak receive (RX) data rate, a peak transmit (TX) data rate, an aggregated RX bandwidth, an aggregated TX bandwidth, a maximum number of active RX carriers, a maximum number of active TX carriers, total allowable bandwidths to be processed by communication apparatus 810, a maximum resource block allocation, a highest modulation and coding scheme, a set of frequency bands for use, a number of active RX antennas, a number of active TX antennas, a maximum RX multiple-input and multiple-output (MIMO) order, a maximum TX MIMO order, a set of services required by an applications processor of communication apparatus 810, a set of radio access technologies (RATs) that can be used by a transceiver of communication apparatus 810 to wirelessly transmit and receive data, and one or more processing requirements of the applications processor.

In some implementations, process 1000 may involve processor 812 performing additional operations. For instance, process 1000 may involve processor 812 managing power states to control power consumption of communication apparatus 810. Moreover, process 1000 may involve processor 812 informing one or more other networked devices in a mesh, ad hoc or peer-to-peer wireless modem network to which communication apparatus 810 is communicatively connected of the change of capability state with respect to communication apparatus 810.

In some implementations, process 1000 may involve processor 812 performing additional operations. For instance, process 1000 may involve processor 812 receiving a user input for one or more user-defined settings. Furthermore, process 1000 may involve processor 812 restricting the set of temporary capability states available for selection by restricting the selection to a subset of temporary capability states of the plurality of temporary capability states based on the user-defined settings.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   negotiating, by a processor of a communication apparatus with time-varying peak processing capability during active operations, with a wireless network to which the communication apparatus is communicatively connected to select one of a plurality of temporary capability states ranging between zero and peak performance of the communication apparatus; and
   initiating, by the processor, a capability state change such that the communication apparatus enters the selected temporary capability state of the plurality of temporary capability states from a current temporary capability state of the plurality of temporary capability states,
   wherein the selected temporary capability state determines a peak processing capability of the communication apparatus,
   wherein a lifetime of the selected temporary capability state exceeds a control information period used by the wireless network to dynamically schedule data transmissions with the communication apparatus, and
   wherein the data transmissions between the communication apparatus and the wireless network are constrained according to the selected temporary capability state.

2. The method of claim 1, wherein the negotiating with the wireless network to select one of the plurality of temporary capability states comprises:
   determining a need to change from the current temporary capability state to another one of the plurality of temporary capability states to reduce power consumption or to increase processing capability of the communication apparatus;
   requesting permission from the wireless network for a change of capability state; and
   receiving a permission from the wireless network for the change of capability state,
   wherein the initiating of the capability state change comprises initiating the capability state change responsive to receiving the permission.

3. The method of claim 2, wherein the negotiating with the wireless network to select one of the plurality of temporary capability states comprises:
   determining, using information of a device thermal state of the communication apparatus, whether a non-preferred temporary capability state of the plurality of temporary capability states with lower power requirements is needed to prevent excessive temperature increase; and
   selecting the non-preferred temporary capability state as the selected temporary capability state responsive to a result of the determining,
   wherein the information of the device thermal state is derived from either of:
      sensor data received from one or more sensors located within the communication apparatus, and
      recent and current device operating parameters of the communication apparatus and a thermal power model.

4. The method of claim 2, wherein the negotiating with the wireless network to select one of the plurality of temporary capability states comprises:
   identifying, using information of residual capacity of a battery of the communication apparatus, a preferred temporary capability state from the plurality of temporary capability states as providing a maximum amount of remaining battery life of the battery compared to other ones of the plurality of temporary capability states; and
   selecting the preferred temporary capability state as the selected temporary capability state responsive to the identifying.

5. The method of claim 1, wherein the negotiating with the wireless network to select one of the plurality of temporary capability states comprises:
   receiving a request or instruction from the wireless network for a change of capability state,
   wherein the initiating of the capability state change comprises initiating the capability state change responsive to receiving the request or instruction.

6. The method of claim 1, wherein the negotiating with the wireless network to select one of the plurality of temporary capability states comprises:
determining a need to change from the current temporary capability state to another one of the plurality of temporary capability states; and
informing the wireless network regarding a change of capability state for the communication apparatus,
wherein the initiating of the capability state change comprises initiating the capability state change responsive to the determining.

7. The method of claim 1, wherein the negotiating with the wireless network to select one of the plurality of temporary capability states comprises:
selecting a preferred temporary capability state from the plurality of temporary capability states;
negotiating with the wireless network to obtain permission from the wireless network to change from the current temporary capability state to the preferred temporary capability state; and
informing the wireless network regarding a change of capability state for the communication apparatus from the current temporary capability state to the preferred temporary capability state.

8. The method of claim 1, further comprising:
managing, by the processor, power states to control power consumption of the communication apparatus; and
informing, by the processor, one or more other networked devices in a mesh, ad hoc or peer-to-peer wireless modem network to which the communication apparatus is communicatively connected of the change of capability state with respect to the communication apparatus.

9. The method of claim 1, wherein the negotiating with the wireless network to select one of the plurality of temporary capability states comprises:
identifying, using information of device requirements of the communication apparatus, a preferred temporary capability state from the plurality of temporary capability states as providing a best power consumption within constraints of the device requirements compared to other ones of the plurality of temporary capability states; and
selecting the preferred temporary capability state as the selected temporary capability state responsive to the identifying.

10. The method of claim 1, further comprising:
receiving, by the processor, a user input for one or more user-defined settings; and
restricting, by the processor, the selecting to a subset of temporary capability states of the plurality of temporary capability states based on the user-defined settings.

11. The method of claim 1, wherein the negotiating with the wireless network to select one of the plurality of temporary capability states comprises:
wherein the negotiating with the wireless network to select one of the plurality of temporary capability states comprises:
identifying, using information of either or both of available network modes and available frequency bands, a preferred temporary capability state from the plurality of temporary capability states as minimizing power consumption of the communication apparatus compared to other ones of the plurality of temporary capability states; and
selecting the preferred temporary capability state as the selected temporary capability state responsive to the identifying.

12. The method of claim 1, wherein the negotiating with the wireless network to select one of the plurality of temporary capability states comprises communicating, by a power configuration management module of the processor, with the wireless network, and wherein the initiating of the capability state change comprises handling, by the power configuration management module, transitions between the current temporary capability state and the selected temporary capability state and corresponding transitions between a first power state and a second power state of a plurality of power states of the communication apparatus.

13. The method of claim 1, wherein the negotiating with the wireless network to select one of the plurality of temporary capability states comprises communicating with a power configuration management module of a network apparatus of the wireless network to select one of the plurality of temporary capability states.

14. The method of claim 1, wherein the initiating of the capability state change comprises:
de-registering the communication apparatus from the wireless network with which the communication apparatus is registered with a first device capability class; and
re-registering the communication apparatus with the wireless network with a second device capability class different than the first device capability class.

15. The method of claim 1, wherein the plurality of temporary capability states pertain to a plurality of aspects of the communication apparatus, and wherein the plurality of aspects of the communication apparatus comprise a peak receive (RX) data rate, a peak transmit (TX) data rate, an aggregated RX bandwidth, an aggregated TX bandwidth, a maximum number of active RX carriers, a maximum number of active TX carriers, total allowable bandwidths to be processed by the communication apparatus, a maximum resource block allocation, a highest modulation and coding scheme, a set of frequency bands for use, a number of active RX antennas, a number of active TX antennas, a maximum RX multiple-input and multiple-output (MIMO) order, a maximum TX MIMO order, a set of services required by an applications processor of the communication apparatus, a set of radio access technologies (RATs) that can be used by a transceiver of the communication apparatus to wirelessly transmit and receive data, and one or more processing requirements of the applications processor.

16. The method of claim 1, wherein the initiating of the capability state change comprises adjusting one or more of:
one or more frequencies of one or more internal clock signals of the communication apparatus;
one or more configured voltages on one or more system power supplies of the communication apparatus; and
a number of resources of the communication apparatus that are currently active.

17. An apparatus, comprising:
a transceiver capable of wirelessly communicating with a network; and
a processor coupled to the transceiver, the processor capable of performing operations comprising:
determining a need to adjust a maximum capability of the apparatus; and
adjusting the maximum capability of the apparatus responsive to the determining, wherein, in adjusting the maximum capability of the apparatus, the processor performs either of a first set of operations or a second set of operations, wherein the first set of operations comprises:
- selecting one of a plurality of capability states corresponding to a plurality of power requirements of the apparatus; and
- initiating a capability state change such that the apparatus enters the selected one of the capability states from a current capability state, and wherein the second set of operations comprises:
- de-registering the apparatus from a network with which the apparatus is communicatively connected and registered with a first device capability class; and
- re-registering the apparatus with the network with a second device capability class different than the first device capability class.

18. The apparatus of claim 17, wherein, in determining the need to adjust the maximum capability of the apparatus, the processor performs one of:
- receiving an instruction to adjust the maximum capacity from a network with which the apparatus is communicatively connected; and
- receiving information from the network indicating that the apparatus is operating below a device class capability of the apparatus when increased performance is required; and
- determining a thermal state of the apparatus, wherein, in selecting the one of the plurality of capability states, the processor selects a non-preferred capability state with a lower power requirement to prevent a temperature increase in the apparatus responsive to the determining of the thermal state.

19. The apparatus of claim 17, wherein, in selecting the one of the plurality of capability states, the processor performs one of:
- selecting, based on information of residual battery capacity of a battery of the apparatus, a preferred capability state allowing a longer battery life than that allowed by other capability states of the plurality of capability states;
- selecting, based on information of available network modes, available frequency bands, or both, a preferred capability state that minimizes power consumption compared to other capability states of the plurality of capability states;
- performing a plurality of operations comprising:
  - receiving a user input for one or more user-defined settings, and
  - restricting the selecting to a subset of capability states of the plurality of capability states based on the user-defined settings;
- adjusting one or more of:
  - one or more frequencies of one or more internal clock signals of the apparatus,
  - one or more configured voltages on one or more system power supplies of the apparatus, and
  - a number of resources of the apparatus that are currently active.

* * * * *